United States Patent [19]

Woog et al.

[11] 3,917,812

[45] Nov. 4, 1975

[54] COMPOSITIONS AND METHOD FOR DIAGNOSING DISEASES OF THE PANCREAS

[75] Inventors: Heinrich Woog, Ludwigshafen (Rhine); Werner Rothe, Hockenheim, both of Germany

[73] Assignee: Boehringer Manheim GmbH, Manheim-Waldhof, Germany

[22] Filed: Mar. 6, 1974

[21] Appl. No.: 448,792

[30] Foreign Application Priority Data

Mar. 22, 1973 Germany............................ 2314270

[52] U.S. Cl. .......................... 424/7; 424/9; 424/16; 424/21; 424/32; 424/33; 424/34; 424/35
[51] Int. Cl.² ................... A61K 29/00; G01N 31/22; G01N 33/16
[58] Field of Search ........... 424/7, 9, 16, 21, 32, 33, 424/34, 35

[56] References Cited
UNITED STATES PATENTS 2,801,203 7/1957 Leb........................................ 424/35
3,079,303 2/1963 Raff....................................... 424/35

FOREIGN PATENTS OR APPLICATIONS 7,600 1/1970 France................................... 424/8

Primary Examiner—Albert T. Meyers
Assistant Examiner—A. P. Fagelson
Attorney, Agent, or Firm—Burgess, Dinklage & Sprung

[57] ABSTRACT

Diagnostic compositions containing fluorescein carboxylic acid esters comprising a hard gelatine capsule containing (a) a granulate and (b) an outer phase surrounding the granulate, wherein the granulate comprises a fluorescein carboxylic acid ester, sodium carboxymethylamylopectin, microcrystalline cellulose and polyvinylpyrrolidone and the outer phase comprises magnesium stearate, talc and lactose, provide particularly efficacious forms of administration of such fluorescein esters in the determination of pancreas enzymes.

12 Claims, No Drawings

COMPOSITIONS AND METHOD FOR DIAGNOSING DISEASES OF THE PANCREAS

The present invention is concerned with a novel and highly effective diagnostic compositions carboxylic acid esters of fluorescein, with a process for the preparation of such compositions, and methods of administering same.

Esterases are formed in the pancreas which play a decisive part in the digestion of foodstuffs. It is, therefore, important that, for the diagnosis of diseases of the pancreas, the function of the pancreas can be dependably, quickly and simply tested. In clinical experiments, it has been ascertained that the esterases produced by the pancreas split the appropriate fluorescein carboxylic acid esters into the corresponding carboxylic acid and fluorescein so that the fluorescein excreted in the urine and the amount thereof detected in the urine gives information concerning the function of the pancreas.

The fluorescein carboxylic acid esters cannot be pressed into tablets since the pressed tablets obtained only disintegrate with difficulty. The active material also cannot be administered in the form of, for example, syrups, drops or the like since, in a dissolved state or in the form of a suspension, it is unstable. Thus, the only possible alternative is to place the active material into capsules.

German Gebrauchsmuster (Utility Model) No. 1,962,589 describes a test capsule which can be used for testing the function of the pancreas. It contains carboxylic acid diesters of fluorescein, as well as sodium phosphate as filler. The external covering consists of conventional film-forming agents. However, experiments in humans show that the use of, for example, soft gelatine capsules is problematical since, under these conditions, blank splittings occur which, in the case of the use of pure fluorescein ester, for example, fluorescein dilauryl ester, are not observed.

It has now been found that these disadvantages can be avoided by the diagnostic compositions and the forms of administration according to the present invention.

The invention provides a highly effective composition and form of administration comprising a hard gelatine capsule which contains a granulate provided with an outer phase, the granulate comprising a fluorescein carboxylic acid ester, sodium carboxymethylamylopectin, microcrystalline cellulose, polyvinyl-pyrrolidone and optionally highly-dispersed silicic acid and/or calcium carbonate and the outer phase comprising magnesium stearate, talc, lactose and optionally microcrystalline cellulose, cornstarch, highly-dispersed silicic acid and/or calcium carbonate.

The content of fluorescein ester is preferably about 0.1 to 0.5 mMol and preferably about 0.25 mMol per capsule. The use of fluorescein dilauryl ester has proved to be very advantageous. The granulate preferably contains 10 to 63% of a fluorescein carboxylic acid ester, 6 to 13% sodium carboxymethylamylopectin, 3 to 7% cellulose, 8 to 18% polyvinyl-pyrrolidone and optionally 0.3 to 0.5% silicic acid and/or 1 to 5% calcium carbonate and the outer phase preferably contains 1 to 2% magnesium stearate, 1 to 4% talc, 10 to 26% lactose and optionally 5 to 11% microcrystalline cellulose, 3 to 11% cornstarch, 1 to 2% silicic acid and/or 1 to 2% calcium carbonate. The particle size of the granulate is preferably about 0.1 to 0.75 mm. The granulate and/or the outer phase can, if desired, also contain conventional coloring and/or flavoring materials.

In particular, the following formulations have proved to be useful, the numerical values given being in mg.:

| | component | I | II | III | IV |
|---|---|---|---|---|---|
| granulate | fluorescein dilauryl ester | 348.5 | 348.5 | 174.25 | 174.25 |
| | sodium carboxymethyl-amylopectin (Primojel) | 70.0 | 70.0 | 35.0 | 35.0 |
| | microcrystalline cellulose (Avicel PH 101) | 40.0 | 40.0 | 20.0 | 20.0 |
| | polyvinylpyrrolidone (Collidon 25) | 100.0 | 100.0 | 49.25 | 49.25 |
| | calcium carbonate | — | 35.0 | — | — |
| | highly dispersed silicic acid (Aerosil) | — | — | 1.5 | 1.5 |
| outer phase | magnesium stearate | 10.0 | 10.0 | 5.0 | 9.0 |
| | highly dispersed silicic acid (Aerosil) | 7.0 | 7.0 | — | — |
| | talc | 20.0 | 20.0 | 20.0 | 22.0 |
| | lactose (Lactose D 80) | 104.5 | 69.5 | 135.0 | 147.0 |
| | microcrystalline cellulose (Avicel PH 101) | — | — | 60.0 | 55.0 |
| | maize starch | — | — | 50.0 | 62.0 |
| | calcium carbonate | — | — | — | 5.0 |
| | total amount | 700.0 | 700.0 | 550.0 | 580.0 |

Formulations III and IV give the best results and are, therefore, preferred.

Our investigations have shown that the production of hard gelatine capsules containing fluorescein esters using conventional methods, is difficult or impossible. For example, it is not possible directly to fill fluorescein dilauryl ester into hard gelatine capsules in an automatic capsule filling and sealing machine because this ester melts at 65°C. and, in the temperature range of 25° to 30°C., sticks to the capsule machine. These difficulties can be overcome to a certain extent by mixing the powdered ester with various adjuvants and filling the mixture into hard gelatine capsules using an automatic capsule filling and sealing machine or by hand. However, such formulations do not give satisfactory results in vivo because the ester sticks during the mixing and filling. This has a disturbing effect on the measurement and on the liberation of the active material. Furthermore, a particular problem arises from the fact that, on the one hand, a high dosage of the fluorescein ester (about 0.25 mMol per capsule) must be ensured and, on the other hand, the making of a formulation with adjuvants is only possible to a limited extent due to the size of the capsule.

It is just as difficult to produce hard gelatine capsules which contain granulates of fluorescein esters as a filling. Thus, for example, in the case of fluorescein dilauryl ester in a dosage of about 175 mg. per hard gelatine capsule, the usual granulation processes with starch paste and carboxymethylcellulose, as well as the melt granulation process, do not provide satisfactory results because these granulates, when being filled into capsules in a capsule machine, become too sticky and thus block up the capsuling machine. The desired hardness of the granulate can admittedly be obtained by granulating with a gelatine solution but, because of the high swelling times of the gelatine, these granulates liberate the active material too slowly.

By means of the process according to the present invention, it is now possible quickly and easily to fill capsules with fluorescein esters. The process according to the present invention is carried out by preparing a granulate in known manner from a fluorescein carboxylic acid ester, sodium carboxymethylamylopectin, microcrystalline cellulose, polyvinylpyrrolidone and optionally highly dispersed silicic acid and/or calcium carbonate, surrounding this granulate with an outer phase comprising magnesium stearate, talc, lactose and optionally microcrystalline cellulose, cornstarch, highly-dispersed silicic acid and/or calcium carbonate, and placing the coated granulate so obtained into hard gelatine capsules.

The process according to the present invention permits, for the first time, a rapid and exact filling of a fluorescein ester into hard gelatine capsules, using an automatic capsule filling and sealing machine.

To summarize, it can be stated that the novel fluorescein ester-containing hard capsules ensure a satisfactory test for the functioning of the pancreas since the requirements for this purpose are fulfilled:

1. a rapid liberation of the fluorescein ester from the capsule is guaranteed;
2. the fluorescein ester used contains less than 1% fluorescein;
3. the optimum dosage of the fluorescein granulate in a capsule filling and sealing machine guarantees that the variation of the gross capsule weight does not amount to more than ± 5%;
4. the fluorescein ester granulate is in the form of granules with a size of 0.1 – 0.75 mm;
5. a high dosage of the fluorescein ester (for example, about 175 mg. in the case of fluorescein dilauryl ester) can easily be placed into a hard capsule of 0 size, this size being comparatively easy to swallow.

The following Examples illustrate, without limitation, the present invention:

EXAMPLE 1

A stock granulate batch for 20,000 hard capsules was prepared in the following manner: 400 g. microcrystalline cellulose (Avicel PH 101), 700 g. sodium carboxymethylamylopectin (Primojel), 3485 g. fluorescein dilauryl ester, 985 g. polyvinylpyrrolidone (Kollidon 25) and 30 g. highly-dispersed silicic acid (Aerosil) were passed through a sieve with a mesh size of 0.75 mm. and thereafter mixed. This mixture was placed in a Diosna granulator or, more advantageously, in a muller mixer, and granulated with at most 1.1 liters of demineralized water. The granulate was dried at a maximum temperature of 45°C. in a fluidized bed granulator (Glatt-WSG) and thereafter passed through a 0.75 mm. sieve. The relative moisture content of the granulate was about 7% and the particle size of the granulate was 0.1 – 0.75 mm.

From this stock granulate, there was prepared the following formulation (for 10,000 hard capsules; corresponding to the above-described formulation III): 500 g. cornstarch, 600 g. microcrystalline cellulose (Avicel PH 101), 1350 g. lactose (Lactose D 80), 200 g. talc and 50 g. magnesium stearate were mixed, homogenized by passing through a 0.4 mm. sieve and thereafter mixed with 2800 g. of the fluorescein dilauryl ester stock granulate in a Lodige mixer for 10 minutes. This mass was filled, using a capsule filling and sealing machine (GKF 350 DOS), into hard gelatine capsules of size 0 at a dosage disc thickness of 20.5 mm. The variation of the gross capsule weight was between 627 mg. and 638 mg., i.e., <±5%. The average disintegration time of the capsule + capsule contents was 5 minutes.

EXAMPLE 2

A stock granulate was prepared in a manner analogous to that described in Example 1. From this stock granulate, there was prepared the following formulation (for 10,000 hard capsules; corresponding to the above-described formulation IV): 500 g. calcium carbonate, 620 g. cornstarch, 550 g. microcrystalline cellulose (Avicel PH 101), 1470 g. lactose (Lactose D 80), 220 g. talc and 90 g. magnesium stearate were homogenized by passing through a 0.4 mm. sieve and thereafter mixed in a Lödige mixer with 2,800 g. of the fluorescein dilauryl ester stock granulate for 10 minutes. This mass was filled, using a capsule filling and sealing machine (GKF 350 DOS), into hard gelatine capsules of size 0 with a dosage ddisc thickness of 20.5 mm. The capsule filling weight was 580 mg.; the variation of the gross weight of the capsules was between 649 mg. and 707 mg., i.e., <±5%. The average disintegration time of the capsule + capsule contents was 8 minutes.

It will be understood that the specification and examples are illustrative but not limitative of the present invention and that other embodiments within the spirit and scope of the invention will suggest themselves to those skilled in the art.

What is claimed is:

1. Diagnostic composition containing fluorescein dilauryl ester, which composition comprises a hard gelatine capsule containing (a) a granulate and (b) an outer phasae surrounding the granulate and coated thereon, wherein said granulate comprises 10 to 63% of said fluorescein dilauryl ester, 6 to 13% of sodium carboxymethylamylopectin, 3 to 7% of microcrystalline cellulose and 8 to 18% of polyvinylpyrrolidone and the outer phase comprises a mixture of magnesium stearate, talc and lactose.

2. The composition of claim 1 wherein the granulate also contains at least one of highly-dispersed silicic acid or calcium carbonate.

3. The composition of claim 1 wherein said outer phase additionally comprises at least one of microcrystalline cellulose, corn starch, highly-dispersed silicic acid or calcium carbonate.

4. The diagnostic composition of claim 1 wherein the fluorescein ester is contained in an amount of from 0.1 to 0.5 mM per capsule.

5. The diagnostic composition of claim 4 wherein the fluorescein ester is contained in an amount of about 0.25 mM per capsule.

6. The diagnostic composition of claim 1 wherein the granulate additionally contains a material selected from the group consisting of 0.3 to 0.5% silicic acid, 1 to 5% calcium carbonate and mixtures thereof.

7. the diagnostic composition of claim 1 wherein the outer phase contains 1 to 2% magnesium stearate, 1 to 4% talc, and 10 to 26% lactose.

8. The diagnostic composition of claim 1 wherein the outer phase additionally contains at least one material selected from the group consisting of 5 to 11% microcrystalline cellulose, 3 to 11% corn starch, 1 to 2% silicic acid and 1 to 2% calcium carbonate.

9. The diagnostic composition of claim 1 wherein the particle size of the granules of the granulate is from about 0.1 to 0.75 mm.

10. Process for the preparation of the diagnostic composition of claim 1 which process comprises preparing a granulate of said fluorescein dilauryl acid ester, sodium carboxymethylamylopectin, microcrystalline cellulose and polyvinylpyrrolidone; preparing an outer phase comprising magnesium stearate, talc and lactose; surrounding and coating said granulate with said outer phase; and placing the granulate coated with said outer phase into a hard gelatine capsule.

11. In the method of diagnosing diseases of the pancreas which comprises oral administration of fluorescein carboxylic acid esters and the determination of the fluorescein excreted in the urine, the improvement which comprises orally administering the fluorescein carboxylic acid ester composition of claim 1.

12. The method of claim 11 wherein said composition is administered in a dosage of up to 175 mM of said fluorescein ester per capsule in unit dosage form.

* * * * *